Dec. 29, 1925.  1,567,588
G. GERACE
ICE CREAM CONE BAKING MACHINE
Filed Nov. 1, 1924  2 Sheets-Sheet 1

Inventor
Giuseppe Gerace
By Shepherd & Campbell
Attorneys

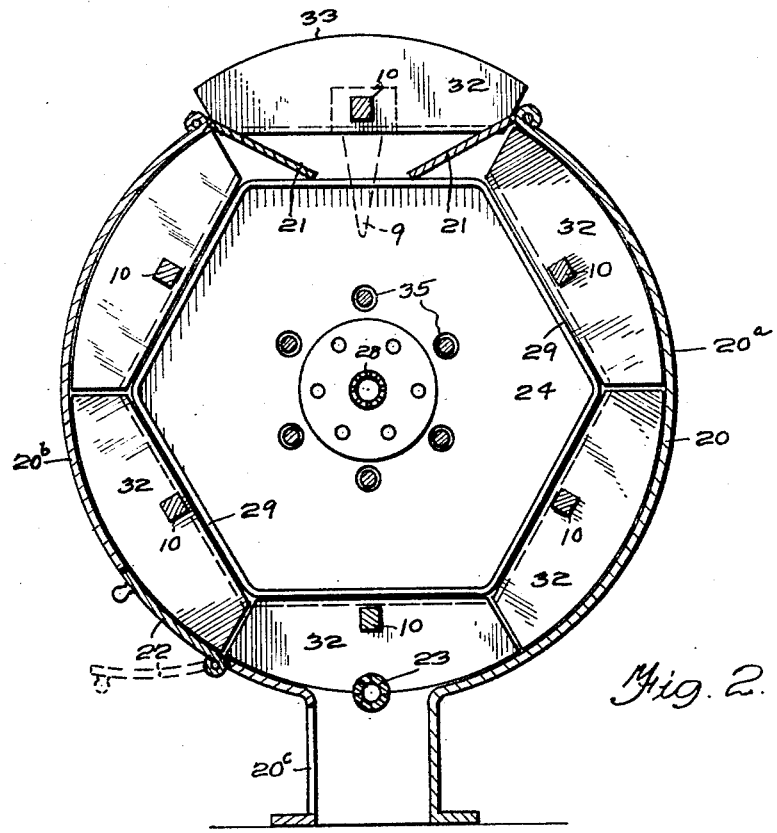
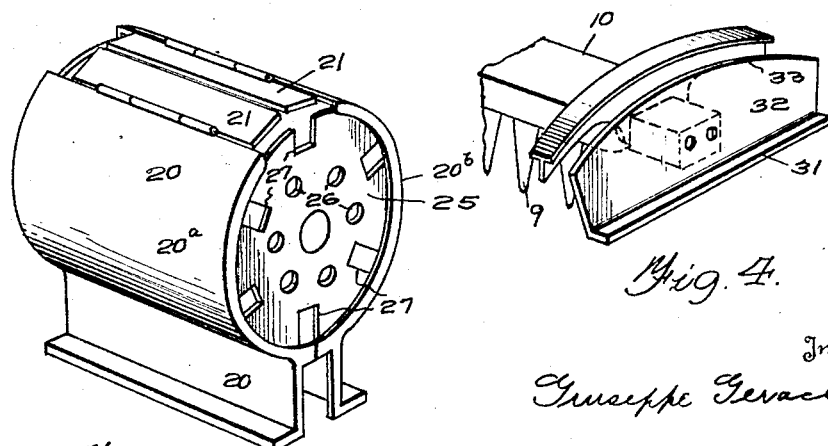

Patented Dec. 29, 1925.

1,567,588

UNITED STATES PATENT OFFICE.

GIUSEPPE GERACE, OF LEBANON, PENNSYLVANIA.

ICE-CREAM-CONE-BAKING MACHINE.

Application filed November 1, 1924. Serial No. 747,210.

*To all whom it may concern:*

Be it known that I, GIUSEPPE GERACE, a citizen of the United States, residing at Lebanon, in the county of Lebanon and State of Pennsylvania, have invented certain new and useful Improvements in Ice-Cream-Cone-Baking Machines, of which the following is a specification, reference being had therein to the accompanying drawings.

This invention relates to an improvement in ice cream cone baking machines of the character of those shown in United States Patent 1,432,049, Oct. 17, 1922, and in my own prior Patent 1,499,649 dated July 1, 1924. The improvements constituting the subject matter of my own prior patent, resided in the provision of an enclosing casing for a cone baking machine by means of which the heat was confined and conserved while at the same time the proper operation of the machine was permitted.

The device of the present invention goes materially beyond the mere provision of an enclosing casing and brings about a mechanical cooperation between the gas saving enclosure and the machine proper, in a wholly novel and advantageous manner as will be hereinafter set forth.

In the accompanying drawings:

Figure 2 is a vertical sectional view upon line 2—2 of Figure 1 looking toward the front of the machine.

Figure 3 is a perspective view of the enclosing casing looking from the rear of the machine, and Figure 4 is a perspective view of one of the segmental plates, hereinafter described.

Like numerals designate corresponding parts in all of the figures of the drawings.

Figure 1:
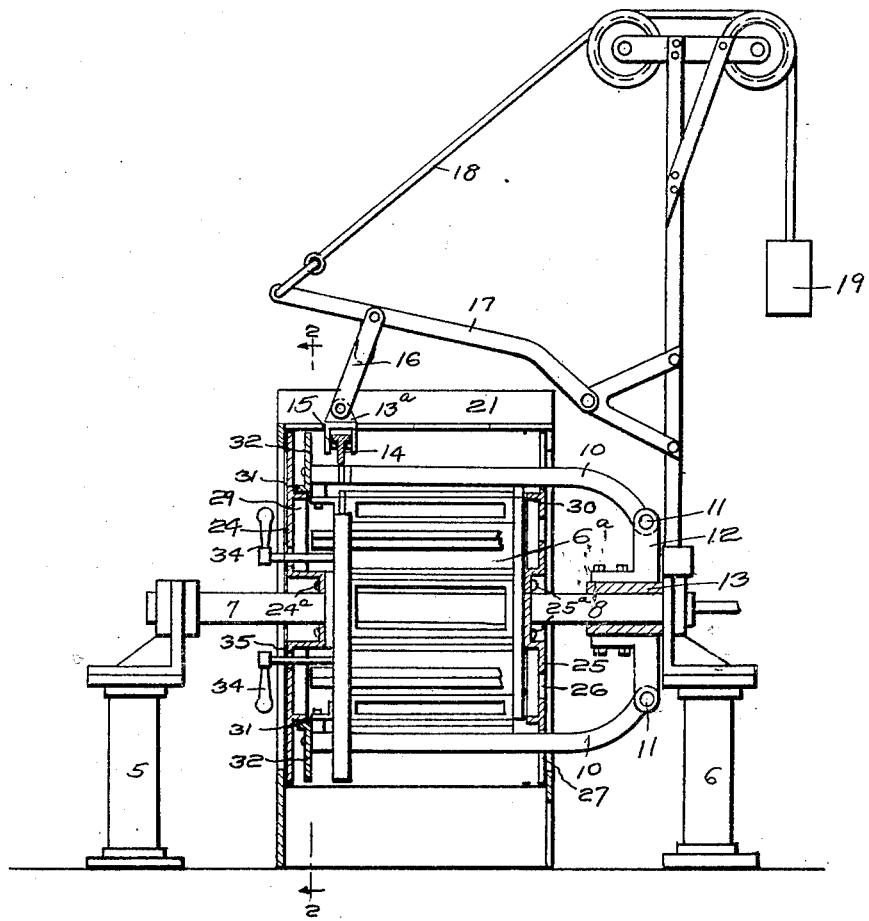
Figure 1 is a side elevation of an ice cream cone baking machine with a gas saving enclosing casing illustrated in section.

The cone baking machine proper is substantially like the machine of Patent 1,432,049, issued Oct. 17, 1922, in that it comprises supporting standards 5 and 6 in which shafts 7 and 8 are journaled for rotation. Molds 6ª are supported from and rotate bodily with shaft sections 7 and 8 and cooperate with tapered cores 9 of radially swinging arms 10, the latter being pivoted at 11 to ears 12 of the sleeves 13. When an arm 10 reaches a position at the top of the machine it is lifted to withdraw the tapered cores 9 from the molds, said lifting being facilitated by engagement of a block 13ª with a T shape member 14 carried by the said arm, said block having pins 15 which engage beneath the flange of said T shape member as best illustrated in Figure 1. The block 13ª is carried by a link 16 and said link is in turn connected to a pivoted arm 17, the latter being counter weighted by means of a cable 18 and weights 19. So far the parts described are of known construction and form no part of my invention. Machines of the character indicated, prior to my invention of the device illustrated in my patent of July 1, 1924, rotated in the open and while a machine of this character is satisfactory in so far as the baking of cones is concerned, the consumption of gas is very large because so much of the heat may escape freely at all points. According to the present invention, I enclose a machine of the character indicated, in a gas conserving casing comprising a drum 20 which is preferably made up of the two section 20ª and 20ᵇ. The section 20ª extends all the way to the floor as illustrated in Figure 3 while the section 20ᵇ is open at one side along the bottom, as indicated at 20ᶜ. This opening permits the entrance of the necessary air to support clean combustion at the burners and provides a point through which the waste which drops from the baking machine may be removed. A pair of doors 21 are located at the top of the casing and partially close said casing at the top while permitting the radially swinging core carrying arms 10 to move upwardly to withdraw the cores from the molds in the usual operation of the machine. The drum 20 is further provided with a door 22 in its side 20ᵇ through which the gas at the lower burner, indicated at 23, may be lighted. The casing further comprises a front wall 24 and a rear wall, 25, the front and rear walls being secured to and rotating bodily with the machine while the casing or drum 20 remains stationary. The point of attachment of the front and rear walls 24 and 25 to the machine is indicated at 24ª, 25ª, respectively. The rear wall 25 is provided with a series of openings 26 and a series of radial slots 27. The openings 26 permit the inspection and lighting of the central burner 28 through them, while the slots 27 permit the necessary outward movement of the arms 10, it being understood that during the rotation of the machine, these arms 10 lie in the slots 27. The rear walls 24 and 25 carry inturned flanges 29 and 30 which lend the necessary stiffness and rigidity to the front and rear walls. By referring to Figure 2 it will be seen that the flanges are of hexagonal outline and the flange 29 not only serves the purpose of lending rigidity to the front wall but it constitutes a seating for the flanged portions 31 of plates 32 which are secured to the ends of the arms 10. These plates 32 have their outer edges curved as indicated at 33 upon an arc corresponding in curvature to the internal diameter of the drum 20 and during the rotation of the machine ride around the inner periphery of the drum whereby all of the arms are held in their closed position except the arm which happens to be at the top of the machine. This arm and its plate may be swung outwardly through the opening constituted by the doors 21.

Machines of the character described comprise as parts of their conventional construction handles 34 which are used to operate the molds and I have indicated such handles upon the drawings and have shown their operating shafts as passing through openings 35 formed in the front wall 24 of my device. The handles constitute no part of my invention but are illustrated to make it clear that the presence of my front wall 24 does not interfere with these handles since the wall and the handles rotate bodily together.

I have preferably covered the drum with asbestos though this is not illustrated since the covering of heating devices with asbestos to conserve heat is so well known in the art as to constitute no feature of invention.

It is to be understood that the invention is not limited to the precise construction set forth but that it includes within its purview whatever changes fairly come within either the terms or the spirit of the appended claims.

Having described my invention what I claim is:

1. The combination with a cone baking machine, comprising a plurality of rotating molds and radially swinging arms, operating in conjunction therewith, of a fixed drum enclosing said machine, the front wall of said drum being secured to and bodily rotated with the machine and an element carried by each of said arms and riding in contact with the drum during the rotation of the machine to hold said arms in closed position.

2. The combination with a bodily rotated cone baking machine comprising a plurality of radially swinging arms, of means for lifting said arms when they reach a predetermined point in the travel of the machine, a drum having doors located at the point of lifting of said arm and front and rear walls closing the ends of said drum, said front and rear walls being secured to and rotating bodily with the machine and said front wall lying outwardly of the free ends of said arms.

3. A structure as recited in claim 2, in combination with plates carried by said radially swinging arms and having their outer edges curved to conform to the internal diameter of the drum said plates riding in contact with the internal surface of the drum to hold the arms in their closed position during rotation of the machine.

4. In combination with a cone baking machine comprising a plurality of radially swinging arms of a drum enclosing said machine, said drum having an opening at its top through which the uppermost of said arms may swing radially outward, front and rear walls for said drum secured to the machine and rotating therewith, the front wall having an inturned flange upon its inner face and the flange having as many sides as there are radially swinging arms, and plates carried by said arms having their inner edges shaped to co-act with said flange and having their outer edges curved to conform to the internal diameter of the drum.

In testimony whereof I hereunto affix my signature.

GIUSEPPE GERACE.